United States Patent
Mito et al.

[11] Patent Number: 5,818,198
[45] Date of Patent: Oct. 6, 1998

[54] BATTERY PACK

[75] Inventors: Toshitsugu Mito, Atsugi; Masahito Kizawa, Fujisawa, both of Japan

[73] Assignee: International Business Machines Corp., Armonk, N.Y.

[21] Appl. No.: 639,008

[22] Filed: Apr. 17, 1996

[30] Foreign Application Priority Data

Apr. 18, 1995 [JP] Japan .................................. 7-092063

[51] Int. Cl.⁶ .................................................. H01M 10/46
[52] U.S. Cl. .......................................... 320/112; 320/147
[58] Field of Search ........................... 320/2, 5, 46, 110, 320/107, 112, 147, 101, 104, 145; 429/96, 97, 98, 99, 100; D13/103

[56] References Cited

U.S. PATENT DOCUMENTS

| | | | |
|---|---|---|---|
| 4,325,106 | 4/1982 | Bartunek et al. | 362/157 |
| 4,513,354 | 4/1985 | Abel | 361/399 |
| 5,466,545 | 11/1995 | Chamberlain et al. | 429/99 |

FOREIGN PATENT DOCUMENTS

| | | |
|---|---|---|
| 0545747 | 6/1993 | European Pat. Off. . |
| 0565217 | 10/1993 | European Pat. Off. . |
| 0621649 | 10/1994 | European Pat. Off. . |
| 0643429 | 3/1995 | European Pat. Off. . |
| 3015751 | 10/1981 | Germany . |
| 3844390 | 7/1989 | Germany . |
| 2950398 | 4/1995 | Germany . |
| 9508848 | 3/1995 | WIPO . |

OTHER PUBLICATIONS

Japanese Patent Publication No. Sho 62–133680, Jun. 1987.
Japanese Patent Publication No. Hei 06–275324, Mar. 1993.
Japanese Patent Publication No. 7–45306, Jul. 1993.

*Primary Examiner*—Edward Tso
*Attorney, Agent, or Firm*—George E. Grosser

[57] ABSTRACT

A battery pack having at least one battery cell and an electronic circuit for controlling the charging and discharging of the cell(s) includes an enclosing cover and base which define a cavity and a partition which extends across the cavity to define separate portions for the electronic circuit and the cell(s) respectively. Preferably the cover and base are attached at their edges and the partition is formed of walls in each which interleave when they are brought together. A flexible material such as silicone rubber fills any void between the partition walls to isolate the electronics cavity from the battery cell cavity and provide a gas-proof seal.

9 Claims, 8 Drawing Sheets

BATTERY PACK

Applicants claim the foreign priority benefits under 35 U.S.C. 119 of Japanese Application Serial No. 7-92063, which was filed Apr. 18, 1995. This Japanese application and its translation are incorporated into this application by reference.

FIELD OF THE INVENTION

The present invention relates to a battery pack that is incorporated in a portable electric/electronic apparatus, and in particular to a battery pack that includes battery cells, such as lithium ion batteries, for which an insoluble electrolyte (i.e., an inflammable organic solvent) is employed. More specifically, the present invention pertains safety features for such a battery pack that includes electronic circuitry.

DESCRIPTION OF THE BACKGROUND

Currently, compact and light electric/electronic apparatuses are being manufactured and are in wide use for which portability has been a design consideration. So-called notebook computers (or portable computers) are good examples. Such portable electric/electronic apparatuses can be driven by their incorporated batteries even at sites, such as outdoors, where there are no commercially available power sources (normally, AC power sources).

Many incorporated batteries are actually formed as a "battery pack", wherein a plurality of battery cells are connected and packaged, in order to obtain an adequate output voltage level for driving an electric/electronic apparatus and a power capacity that is sufficient for operation over an extended period of time. For economy and recycling considerations, rechargeable battery cells are normally employed. The rechargeable batteries are, for example, nickel-cadmium (Ni—Cd) batteries, nickel-hydrogen (NiMH) batteries, and ion batteries, such as lithium ion (Li—Ion) batteries. Conventionally, from the view point of reliability and maintenance, batteries, such as (Ni—Cd) batteries and NiMH batteries, that employ a soluble electrolyte are frequently adopted. At present, however, there is a demand for the use of lithium ion batteries, and the size of the potential market is considered to be large. Since ion batteries have a high energy density per weight (Wh/kg) and a high energy density per volume (Wh/l), they conform to the trend towards the reduction in the size and the weight of portable electric/electronic apparatuses.

Many electric/electronic apparatuses that employ a rechargeable battery pack also incorporate an electric circuit for the control of charging and discharging. The electric circuit that controls the charging and the discharging measures data, such as the output terminal voltage of a battery pack, the quantity of a current at the time of charging and discharging, and the internal temperature of the battery pack, that are required for the control of the charging and the discharging, and reports, these data externally (i.g., to the body of an electric/electronic apparatus). The control of the charging and the discharging varies in consonance with the hysteresis and the specifications for a battery pack. In addition, a battery pack may be replaced by another pack when necessary, but an electric/electronic apparatus can not manage all types of battery packs. Currently, therefore, special battery packs (so-called intelligent batteries) have appeared that incorporate a controller and various sensors, and that manage the beginning and the completion of the charging and the discharging and report it to the main electric/electronic apparatuses. Such an intelligent battery is disclosed in, for example, the specification for Japanese Patent Application No. Hei 05-184098 (Our company reference No. JA9-93-032), which is assigned to the present applicant. The ThinkPad 750 notebook computer (ThinkPad a trademark of IBM Corp.) that is sold by IBM Japan, Ltd., employs an intelligent battery. The advantages of an intelligent battery are that it relieves an main electric/electronic apparatus from the work load that is imposed by the management of a battery pack, and that it contributes to a reduction in the size of and in the space that is required for a power source in the electric/electronic apparatus.

Since a property of the lithium in the lithium ion battery is that it reacts violently with water, generally, an inflammable organic solvent is employed as an electrolyte, and gas that is generated by the vaporization of the electrolyte may leak from the battery cell. If leaking electrolyte leaks onto an electric circuit, a short circuit may occur or should the electrolyte contact a heat generator it could cause a fire. When the ambient temperature of the battery cell is increased due to overcharging, the vaporization of the electrolyte may be aggravated increasing the danger. When a lithium ion battery is employed as the above described intelligent battery, the controller chip and an amplifier of the battery electronics may act as a heat generator and trigger a fire. Further, due to heat that is generated by such a fire, the more electrolyte may leak out and cause the fire to become larger. Since an incorporated battery pack is mounted in an electric/electronic apparatus, not only will the battery pack be destroyed by the fire it originates, but also peripheral devices around the pack may be damaged.

To overcome the above shortcomings, there is one proposed method that calls for a single battery cell to be designed with a completely sealed structure to prevent the leakage of electrolyte and gas that is generated when it is vaporized. When a battery cell is completely sealed, however, excess energy that is generated inside of the battery cell can not escape, and thus, a rather large explosion could occur (commonly, a battery cell is formed with an enclosing can and a sealing plate for closing the top face, with safety holes being bored in the sealing plate so that gas that is generated as the internal pressure increases can be discharged externally as needed.)

Accordingly, for the employment of an ion battery cell, such as a lithium ion battery, a safety structure is required that differs from that of a conventional battery cell, such as a Ni—Cd or a NiMH cell.

It is one feature of the present invention to provide a battery pack that is incorporated in and is employed by a portable electric/electronic apparatus.

It is another feature of the present invention to provide an excellent battery pack that includes battery cells, such as lithium ion batteries, that employ an inflammable organic solvent as an electrolyte.

It is an additional feature of the present invention to provide a battery pack that can appropriately prevent a fire that results from the ignition of gas that is produced by the vaporization of an electrolyte, even when the ambient temperature of the battery cell is increased due to heat that is generated by an incorporated electric circuit or by overcharging.

SUMMARY OF THE PRESENT INVENTION

To achieve the above, according to a first aspect of the present invention, a battery pack, in which are integrally packaged one or more battery cells and an electric circuit for controlling charging and discharging of the battery cells, comprises: a case for the battery cells that includes a partition wall for defining a battery chamber, for containing the battery cells, and an electric circuit chamber, for containing the electric circuit, wherein the electric circuit is hermetically isolated from the battery cell chamber by the partition wall.

According to a second aspect of the present invention, a battery pack, in which are integrally packaged one or more battery cells and an electric circuit for controlling charging and discharging of the battery cells, comprises: a case for the battery cell that includes a partition wall for defining a battery chamber, for containing the battery cells, and an electric circuit chamber, for containing the electric circuit, wherein the electric circuit is hermetically isolated from the battery cell chamber by the partition wall, and wherein at least one safety hole is formed in a battery cell side of the case in order to release an electrolyte that leaks from the battery cells, or gas that is produced by the vaporization of the electrolyte.

According to a third aspect of the present invention, a battery pack, in which are integrally packaged one or more battery cells and an electric circuit for controlling charging and discharging of the battery cells, comprises: a case for the battery cells that includes a partition wall for defining a battery chamber, for containing the battery cells, and an electric circuit chamber, for containing the electric circuit, wherein the electric circuit is hermetically isolated from an atmosphere in the battery cell chamber by the partition wall, and wherein a portion of the electric circuit is covered with insulating material.

According to a fourth aspect of the present invention, provided is a battery pack, in which are integrally packaged one or more battery cells and an electric circuit for controlling charging and discharging of the battery cells, wherein the battery cells are so located that positive terminals of the battery cells are on the sides that do not face toward the electric circuit.

According to a fifth aspect of the present invention, provided is a battery pack, in which are integrally packaged one or more battery cells and an electric circuit for controlling charging and discharging of the battery cells, wherein the battery cells are so located that a sealing plate for the battery cells is on the side that does not face toward the electric circuit.

According to a sixth aspect of the present invention, provided is a battery pack, in which are integrally packaged one or more battery cells and an electric circuit for controlling charging and discharging of the battery cells, wherein the battery cells are so located that a safety hole for the battery cells is on the side that does not face toward the electric circuit.

According to a seventh aspect of the present invention, provided is a battery pack that is cited in one of claims 1 through 7 wherein the case of the battery pack employs polycarbonate as a base and is toned with noninflammable dyes.

According to the first, the second and the third aspect of the battery pack of the present invention, even when an electrolyte (an inflammable organic solvent) and gas that is produced from its vaporization leaks from a battery cell, an electric circuit is isolated by a partition wall and thus is not contacted by the electrolyte. Although included in the electric circuit are heat generators, such as a controller chip and an analog circuit, as the circuit is not contacted by the electrolyte, ohmic short circuits (short circuits with resistance) and fires that are caused by such short circuits are prevented from occurring.

According to the second aspect of the present invention, the gas that is generated by the vaporization of an electrolyte is released externally through a safety hole that is formed in a side of a chamber in which a battery cell is contained, so that little gas invades a chamber in which an electric circuit is contained.

According to the third aspect of the present invention, since the essential portion of an electric circuit is covered with insulating material, ohmic short circuits (short circuits with resistance) will not occur even if a gas vapor enters and dampens that portion.

A cylindrical sealed battery cell is commonly designed to be sealed at its positive electrode side, as will be described in more detail later. A mechanical member, such as a safety valve and a safety hole, is provided near the sealed portion to release gas vapor externally as the internal pressure increases. In other words, the battery cell is designed that gas vapor can leak from the positive electrode side of the battery cell.

According to the seventh aspect of the present invention, toning of the case of a battery pack is performed with noninflammable dyes, so that even if a fire originates in a battery cell or an electric circuit, the spread of the fire to the other portions will be greatly inhibited.

BRIEF DESCRIPTION OF THE DRAWINGS

For a fuller understanding of the present invention reference should be had to the detailed description below taken in conjunction with the drawings in which:

FIG. 4 is an exploded diagram illustrating a base board and a cover for the battery pack, with FIG. 4(a) specifically showing the base board and with FIG. 4(b) specifically showing the cover.

FIG. 6 is a cross sectional view of the vicinity of a partition wall when the battery pack is assembled, with FIG. 6(a) specifically showing a cross section of a portion where a lead is passed through, and with FIG. 6(b) specifically showing a cross section of a portion other than one where a lead is passed through.

DESCRIPTION OF THE PREFERRED EMBODIMENT

Figure 1:
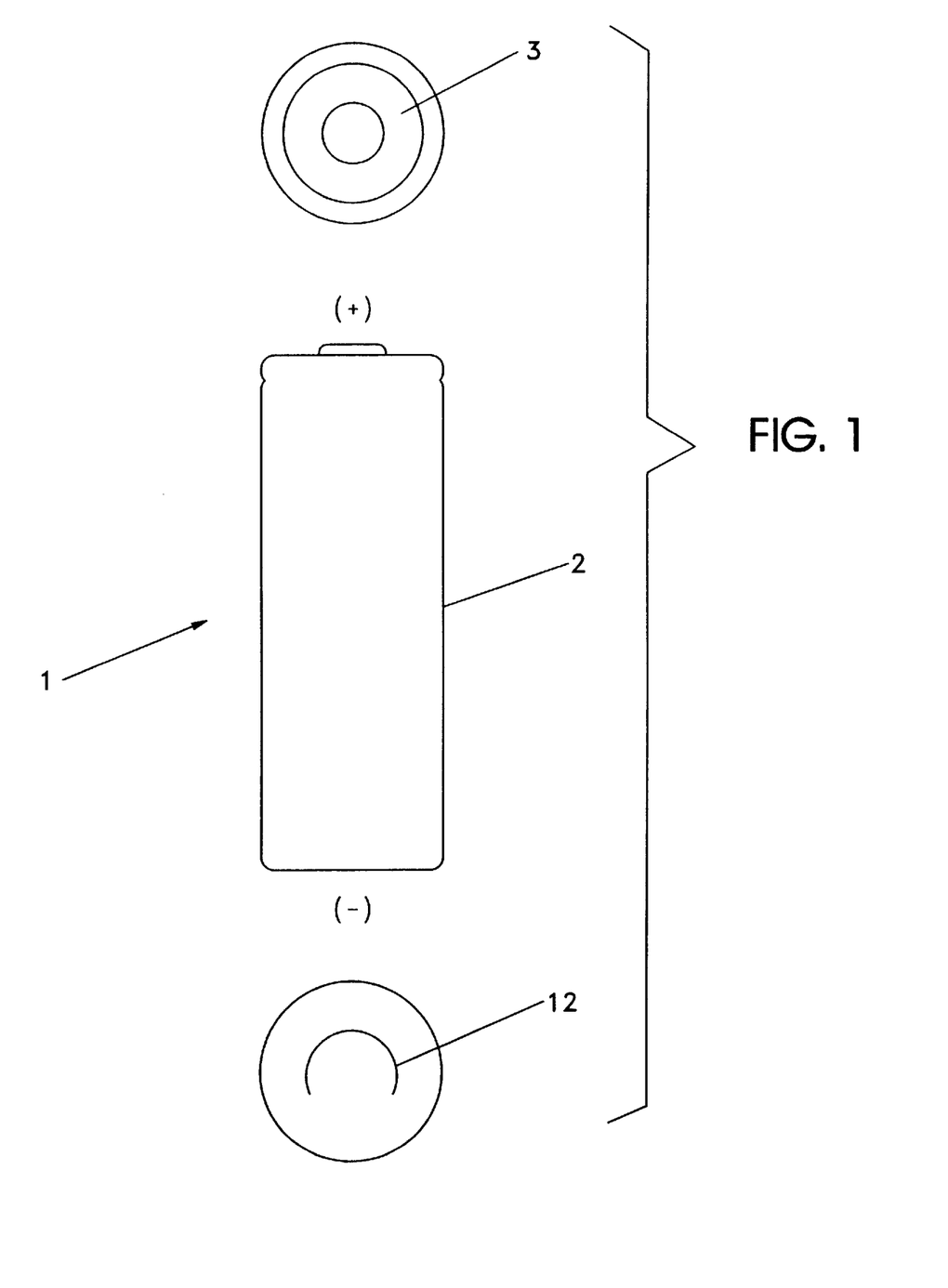
FIG. 1 is a diagram illustrating an external appearance of a battery cell according to one embodiment of the present invention.

A preferred embodiment of the present invention will now be described in detail while referring to the drawings.
The structure of battery cell As is shown in FIG. 1, the lithium ion battery cell 1, as well as other secondary batteries, has a cylindrical sealed structure with an enclosing can 2 and a sealing plate 3 that seals the top face. An insulating resin is used to coat the side face of the enclosing can 2, and its exposed bottom serves as the negative terminal of the battery cell 1. A protrusion that is formed almost at the center of the sealing plate 3 serves as the positive terminal of the battery cell 1.

Figure 2:
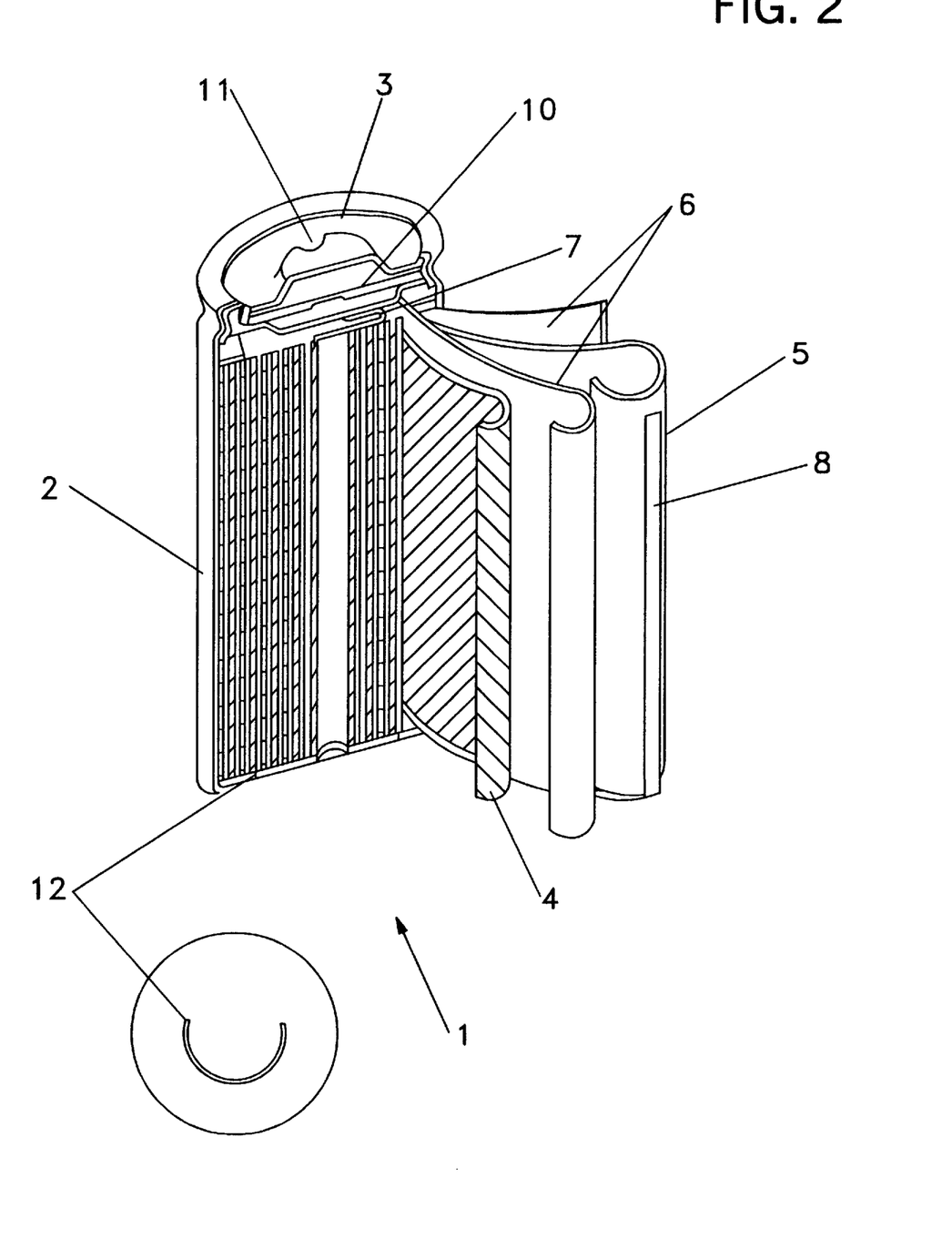
FIG. 2 is a diagram illustrating the internal structure of the battery cell of FIG. 1.

As is shown in FIG. 2, the interior of the lithium ion battery cell 1 is designed as a laminated roll that consists of a positive electrode film 4, separators 6 and a negative electrode film 5, all of which are thin sheets, with the laminated roll being retained in the enclosing can 2.

The positive electrode film 4 is formed of an active material (lithium metal oxide: a specific example being $LiCoCO_2$) that is bonded to metal foil. The negative electrode film 5 is formed of carbon particles that are bonded to metal foil. The separators 6 are formed of polymer film that electrically separates the positive electrode film 4 from the negative electrode film 5 and permits ions to pass through. A sufficient quantity of an electrolyte (aprotic organic solvent) for carrying; electrons is employed to impregnated the positive electrode film 4, the negative electrode film 5 and the separators 6. One end of the positive electrode film 4 communicates with the sealing plate 3 by means of a positive lead 7. One end of the negative electrode film 5 communicates with the bottom face of the enclosing can 2 by means of a negative lead 8.

The edge around the top opening in the enclosing can 2 is bent inward, and a gasket 9 is retained inside the bent portion. The disk shaped sealing plate 3 and the safety valve 10 are fitted into the opening of the enclosing can and held by the gasket 9. The safety valve 10 is flexible in the axial direction of the cylinder of the battery cell 1 (i.g., upward and downward in FIG. 2). The safety valve 10 is deformed as the internal pressure of the battery cell 1 is increased due to the generation of gas, and breaks the connection between the positive lead 7 and the positive terminal on the sealing plate 3. A safety hole 11 is formed in the sealing plate 3 to provide a port for gas that is generated to pass through and be externally released, and excess energy is thereby prevented from accumulating in the battery cell 1.

An arched break portion that is formed in the bottom of the enclosing can 2 is a safety break valve 12. The safety break valve 12 easily ruptures before excess energy is accumulated in the battery cell 1 and prevents a large explosion.

The output voltage of a single lithium ion battery cell normally is approximately 3.6 [V] (4.3 [V] at the maximum and 2.5 [V] at the minimum), which is three times that of a (Ni—Cd) battery cell or a NiMH battery cell of almost the same size. As the principle of the charging and the discharging of the lithium ion battery is well known by one having ordinary skill in the art and does not much relate to the subject of the present invention, an explanation for it will not be given.

The above described structure of the battery cell is well known by one having ordinary skill in the art. It should be noted that the feature of the present invention is a battery pack that includes battery cells and that the subject of the present invention is not limited to the detailed structure of the individual battery cells. It will become obvious during the following explanation that a structure of a battery cell other than that which is shown in FIGS. 1 and 2 can be employed for a battery pack according to the present invention.

Figure 3:
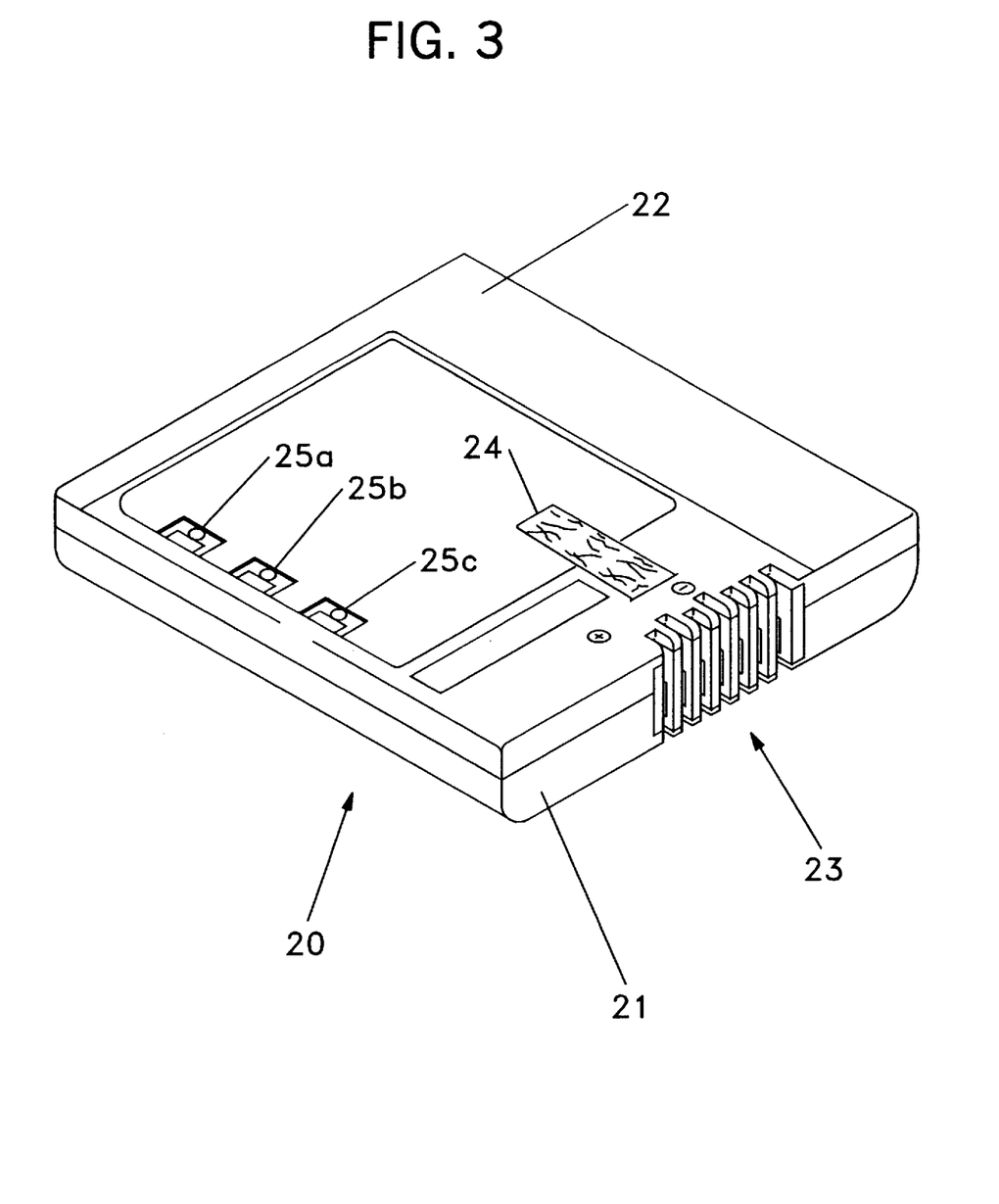
FIG. 3 is a diagram illustrating a battery pack according to the present invention.

The structure of battery pack:

As is shown in FIG. 3, the battery pack 20 is a flat structure that includes a base 21, a cover 22, and a head portion 23.

The base 21, which has a shallow bottom depth, includes battery chambers in which one or more (twelve, in this embodiment) battery cells are retained; and an electric circuit chamber in which is provided a print wiring board 50. On the print wiring board 50, electric circuits are mounted for controlling the charging and discharging of the battery cells (which will be described later).

The cover 22, which has a shallow bottom depth, covers the top portion of the base 21. A ribbon, 24 is provided on the cover 22, with only one end of the ribbon being fixed to the cover 22, so that to remove the battery pack 20 from an electric/electronic apparatus (not shown), it is merely necessary to pull the other, free end, of the ribbon 24. Three safety holes 25a, 25b and 25c are formed in the top left side of the cover 22. The safety holes 25a through 25c are employed to externally release gas that is generated in the battery cell by the vaporization of an electrolyte (which will be described later).

At the head portion 23, a plurality of open slots are formed in the upper, the side and the lower faces of the battery pack 20. A pair of terminals are provided on the internal walls of each slot. The positive terminal of the battery pack 20 is assigned to a slot 23-a, the negative terminal is assigned to a slot 23-b, and a control terminal, for exchanging data, such as a remaining battery capacity, with an electric/electronic apparatus (not shown) is assigned to a slot 23-c.

The base 21, the cover 22 and the head portion 23 can be fabricated of a resin, which has polycarbonate as its base, by using a well known fabrication method. Since polycarbonate is an almost transparent material, and since the interior is visible through it, generally, dyes are added to it for color toning. As black is usually employed as a basic color for current notebook computers, it is therefore popular for the battery pack 20 to also be black so that it matches the color of the computer body. However, the black dyes that are employed for toning are ordinarily carbons (e.g., inflammable material), so that the battery pack 20 may be easily burnt once a fire occurs in the battery cells. In this specification, therefore, it is preferred that noninflammable titanium oxide, be added as a toning the color (it should be noted that the color in this case becomes white).

Figure 4A:
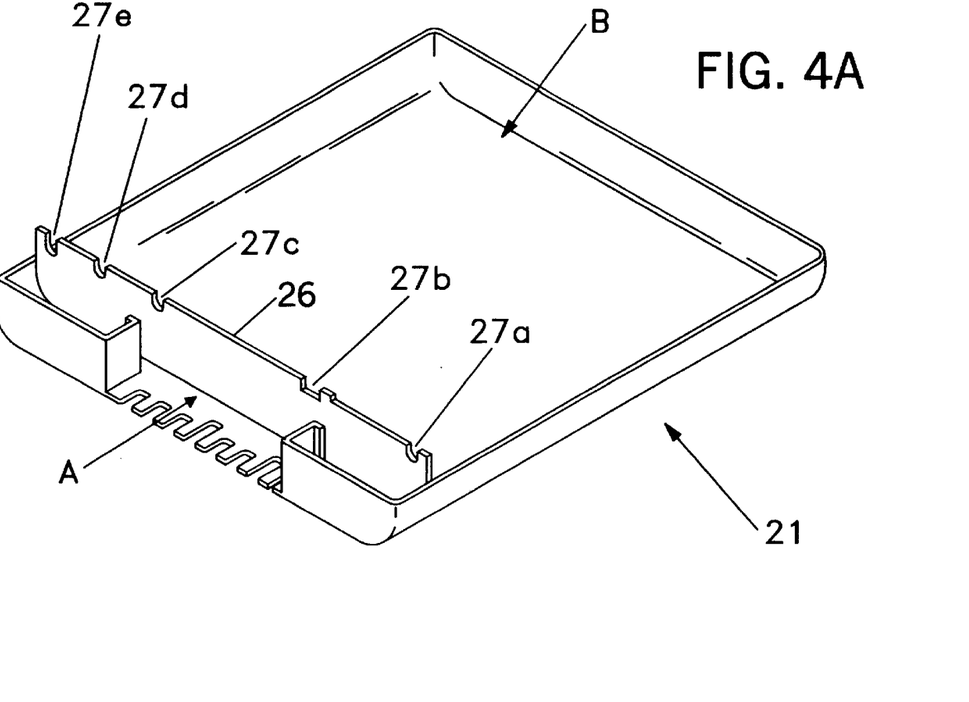

As is shown in FIG. 4(a), the base 21 has a shallow bottom depth. In the base 21 is provided a partition wall 26 that defines a front space A (hereafter referred to as an "electric circuit chamber"), for retaining a print wiring board 50, and a rear space B (hereafter referred to as a "battery chamber"), for retaining battery cells. In the battery chamber B are provided twelve battery cells; six widthwise and two vertically (which will be described later; see FIG. 5). The partition wall 26 is so formed that its height is almost the same as the diameter of the battery cell, and the edge of the partition wall 26 extends to the bottom face of the cover 22 when the cover 22 is closed. Further, five notches, 27a, 27b, 27c, 27d and 27e are formed in the edge of the partition wall 26. Through the notch 27a is passed a negative side lead 52a of the battery cell assembly. Through the notch 27b is passed a terminal 52b of a thermistor that detects the ambient temperature of the battery cells. Through the notch 27c is passed a positive side lead 52c of the battery cell assembly. Through the notches 27d and 27e are passed leads 52d and 52e for monitoring the terminal voltage at the middle point of the battery cell assembly in the series connection. There is a cut-out portion formed substantially in the center at the front of the base board 21 for attachment of the head portion 23 thereto.

Figure 4B:
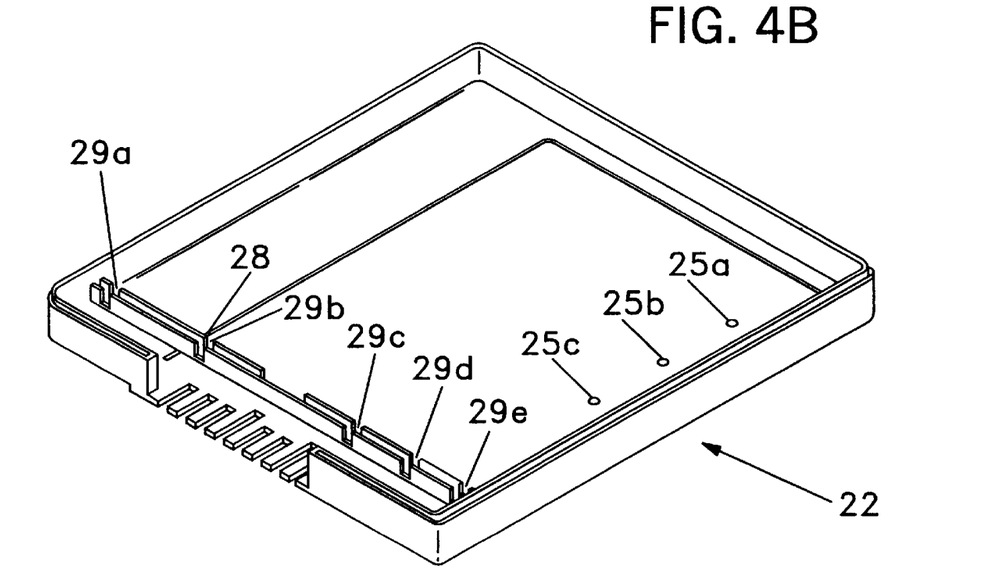

As is shown in FIG. 4(b), the cover 22 has a shallow bottom depth. The sum of the depths of the base 21 and the cover 22 is almost equal to the diameter of the battery cells. In a groove portion 28 that is formed in almost the front portion of the cover 22 can be fitted to the partition wall 26 of the base 21. The groove portion 28 has a pair of ribs that run parallel each other. In the groove portion 28, five notches 29a through 29e are formed that correspond to the notches 27a through 27e that are formed in the edge of the partition wall 26. When the cover 22 is attached to the base 21, silicon rubber is used to coat the groove portion 28, which is then so bonded to the partition wall 26 that there is no gap (which will be described later). Three safety holes 25a through 25c are bored to the rear backward in the bottom of the cover 22. The safety holes 25a through 25c are through holes for the release of gas that is generated by vaporization of an electrolyte, which leaks from the battery cells, to the outside of the battery pack 20. The number of holes is merely determined in consonance with the design choice. There is a cut-out portion almost in the center of the front of the cover 22 for the attachment of the head portion 23 thereto.

Figure 5A:
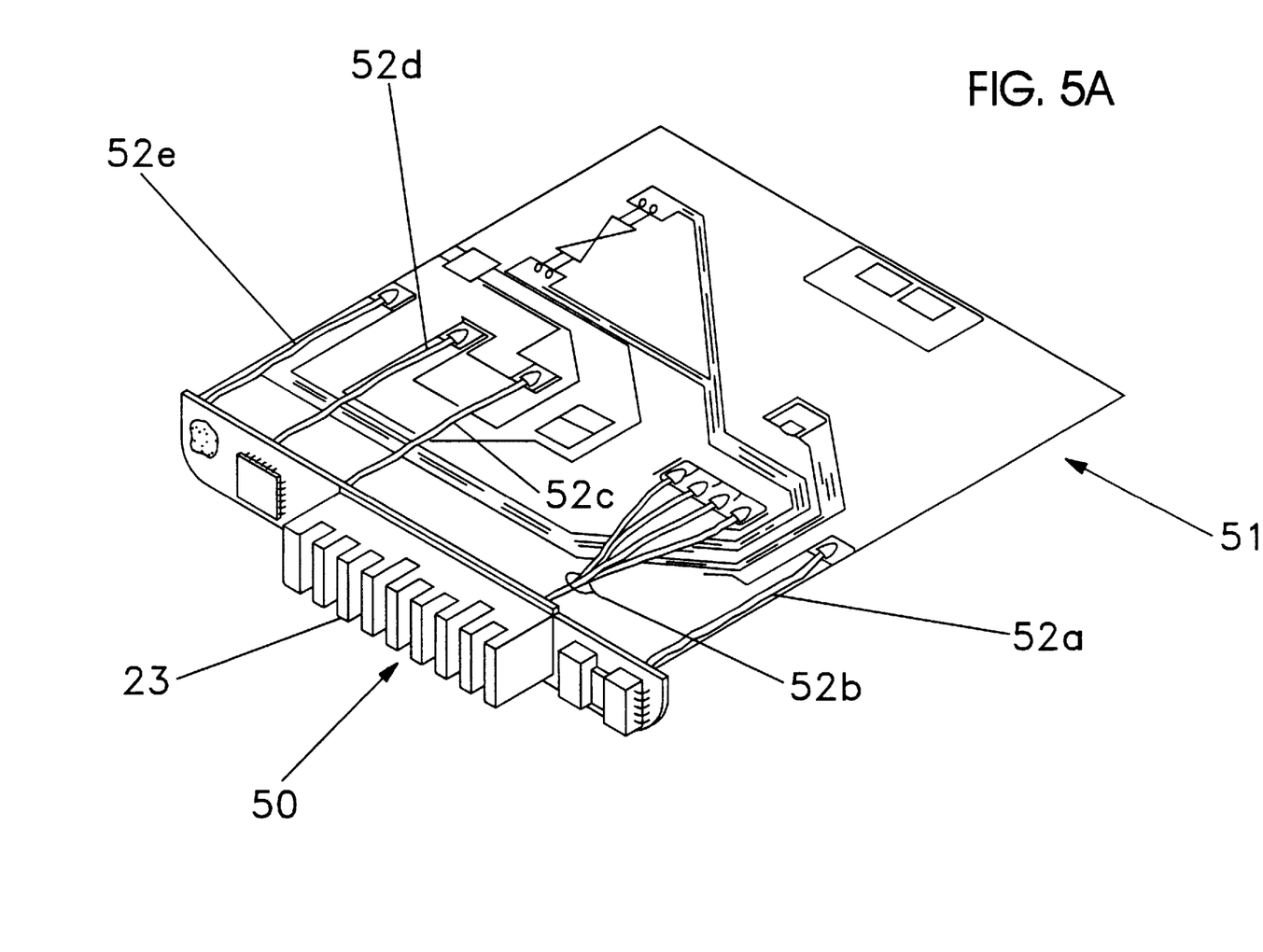
FIG. 5(a) is a diagram illustrating the external appearance of an electric circuit that is included in the battery pack.

The electric circuits are roughly sorted onto the print wiring board 50 and a flexible board 51. The print wiring board 50 is a circuit board 50 on which are mounted essential electric circuits, such as a voltage comparator 32 and a controller 33 (both of which will be described later), and is stored in the electric circuit chamber A of the battery pack 20. The head portion 23 that includes the output terminal of the battery pack 20 is also provided on the print wiring board 50. The flexible board 51 is a circuit board on which is mounted wiring for connecting the battery cell assemblies 30a . . . and a thermistor 36 (which will be described later), for detecting the ambient temperature of the battery cells. Since the board 51 is stored together in the battery chamber B with the battery cell assemblies 30a . . . , whose surfaces are not flat, flexible material is employed for the board 51. The five leads 52a through 52e are extended from the flexible board 51 to the print wiring board 50 (which will be described later).

Figure 5B:
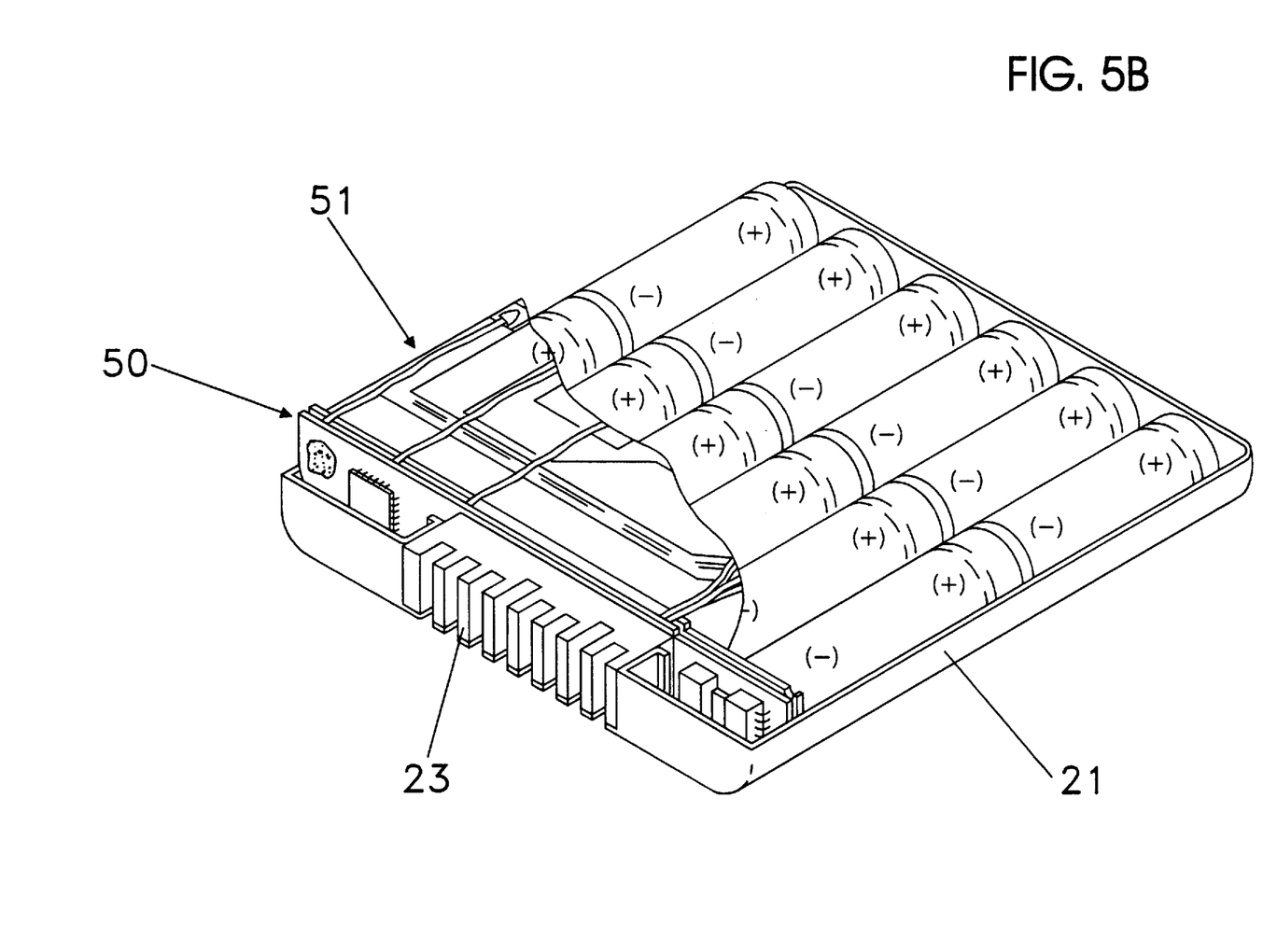
FIG. 5(b) is a diagram illustrating a battery cell assembly and electric circuits (a print wiring board and a flexible circuit board) that are mounted in the base board.

FIG. 5(b) is a diagram of the battery cell assemblies 30a . . . and the electric circuits (the print wiring board 50 and the flexible board 51) that are stored in the base 21. It should be noted that most of the flexible board 51 is cut away to clearly show the arrangement of the battery cells. The battery pack 20 in this embodiment has twelve battery cells, which are so provided that their positive terminals face to the rear, i.e., the side opposite to that which is formed by the print wiring board 50, as is shown in FIG. 5(b). The battery cell is so designed that an electrolyte can easily leak from the positive electrode, as is shown in FIG. 3 (the positive terminal is formed with the sealing plate 3 and the safety hole 11 is formed in the sealing plate 3). The devices and terminals (i.e., active portions), to which a relatively high voltage is applied, are mounted on the print wiring board 50 at comparatively short intervals (which will be described later). When such an electrically active portion is moistened by an inflammable electrolyte, an ohmic short circuit can occur that may cause a fire. In this embodiment, therefore, the portion (positive electrode side of the battery cells) from which an electrolyte easily leaks, and the active portion (the print wiring board 50) are positioned apart from each other. A battery pack that includes electric circuits is also disclosed in, for example, the specifications for Japanese Unexamined Patent Publication No. Sho 62-133680 and for Japanese Unexamined Patent Publication No. Hei 06-275324, in addition of the specification for Japanese Patent application No. Hei 05-184098 that is described in (It should be noted that the structures and functions of the electric circuits vary). It should be filly understood that the present invention is not directed the structure of the electric circuit per se, but the present invention is applicable to a battery pack that has an electric circuit.

As is described above, since a sufficient quantity of silicon rubber is employed to coat the groove portion 28 of the cover 22, the silicon rubber fills the gap between the groove portion 28 and the partition wall 26 when they are bonded together. The atmosphere in the electric circuit chamber A, for retaining the electric circuits, and that of the battery chamber B, for retaining the battery cells, are completely separated by the partition wall 26. Even if electrolyte in the battery cell is vaporized by the heat that generated, the gas that is produced will not enter the electric circuit chamber A. Rather, it will be discharged externally through the safety holes 25a . . . that are formed in the battery chamber B.

The notebook computer "ThinkPad" series that is sold by IBM Japan, Ltd., for example, has a keyboard arranged upward in the bay in which a battery pack is included. As is well known by one having ordinary skill in the art, the keyboard does not include active items that consume high power. Thus, even if the keyboard is exposed to a gas that is produced by the vaporization of an inflammable organic solvent, which is released through the safety holes 25a, the possibility that a fire will break out is very low.

Circuit structure in battery pack:

The structure of the electric circuit in the battery pack 20 will now be explained. It should be noted that the following explanation is given merely to enable the technique that relates to the present invention to be fully understood. The object of the present invention is to prevent ohmic short circuits and the outbreak of fires at the electric circuit, both of which are due to the leakage of electrolyte, and the subject of the present invention is not limited by the structure of the electric circuit.

Figure 7:
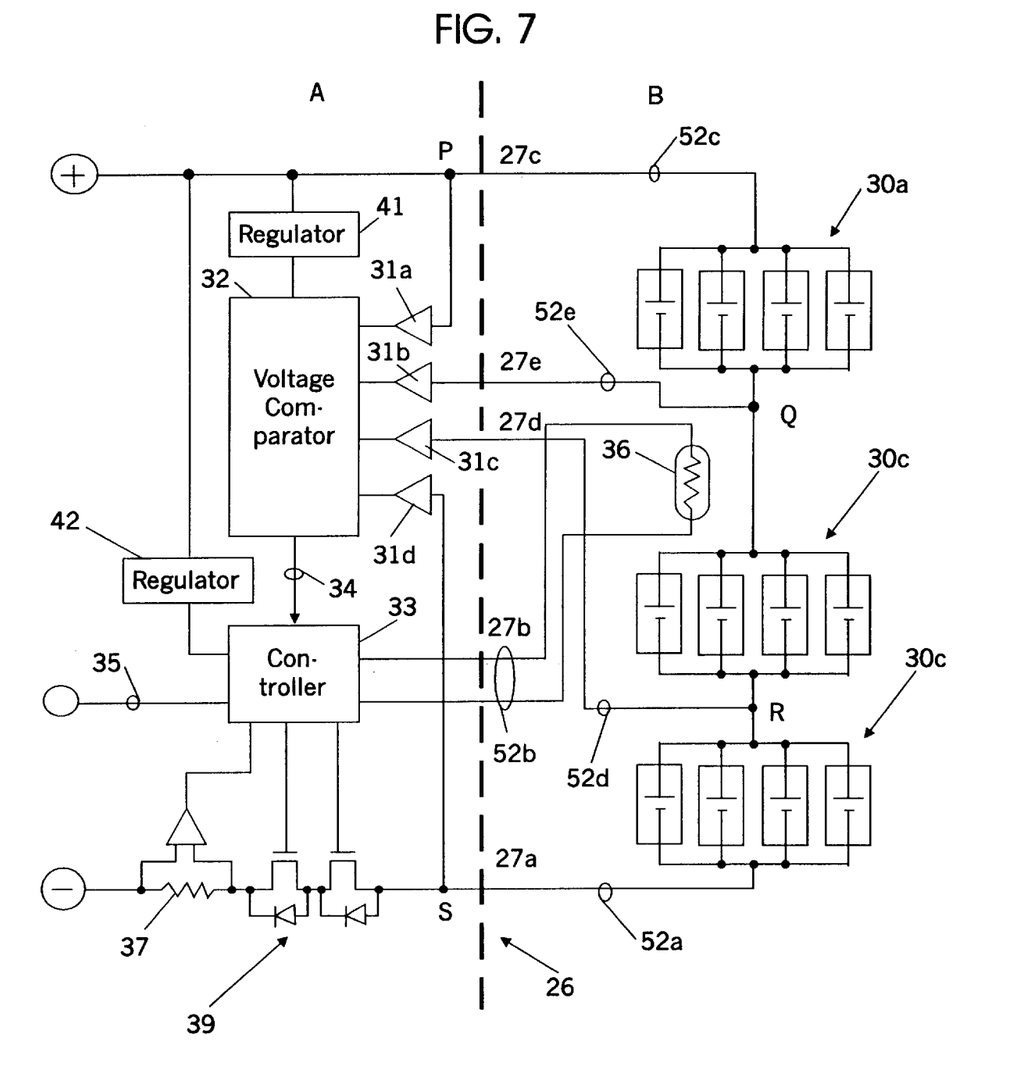
FIG. 7 is a schematic diagram illustrating the structure of the internal circuit of the battery pack.

In FIG. 7, three battery cell assemblies 30a,30b and 30c, each of which is made up of four battery cells that are connected in parallel, are connected in series, and both ends of the assemblies are connected to the positive and the negative terminals of the battery pack 20. The number of battery cells that are connected in series and in parallel is determined by the output terminal voltage and the charging capacity of the battery pack 20 that an electric/electronic apparatus requires (by design choice, in other words). The voltages at the positive and negative terminals 11 and S of each battery cell assembly, and at terminals Q and R, by which the battery cell assemblies 30a . . . are connected, are transmitted as voltage data to the voltage comparator 32 via respective amplifiers 31a through 31d. The thermistor 36 is provided at the periphery of the battery cell assemblies 30a . . . . The thermistor 36 is a device that changes a resistance in consonance with an ambient temperature (well known), and its output terminal is connected to the controller 33.

The voltage comparator 32 detects the output terminal voltages of the battery cell assemblies 30a . . . and determines whether or not the output terminal voltages have exceeded an overcharge voltage (4.3 [V]) or whether or not the output terminal voltages are lower than the overdischarge voltage (2.5 [V]), and reports the result to the controller 33 across a signal line 34.

A resistor 37 for current-voltage conversion is connected in series to the negative terminal of the battery pack 20. The drop voltage at the resistor 37 is proportional to the output current of the battery pack 20 and is inputted to the controller 33 via an amplifier 38.

The controller 33 employs data for the ambient temperature of a battery cell, which is received from the thermistor 36, and the output current of the battery pack 20, which is received from the amplifier 38, to detect the charging start time for the battery cell and the charging completion time. The controller 33 then sends a charging start request or a charging halt request via a control signal line 35 to an electric/electronic apparatus (not shown). Upon the receipt of the data from the voltage comparator 32, the controller 33 detects the overcharged state or the overdischarged state of any battery cell assembly 30a to 30c, and opens a switch 39 to prevent the battery cells from being destroyed. In this embodiment, the switch 39 is constituted by two FET switches, whose drain terminals face each other and that are connected in series. A combination of other devices (e.g., bipolar transistors) that have equivalent functions may be employed.

Figure 6A:
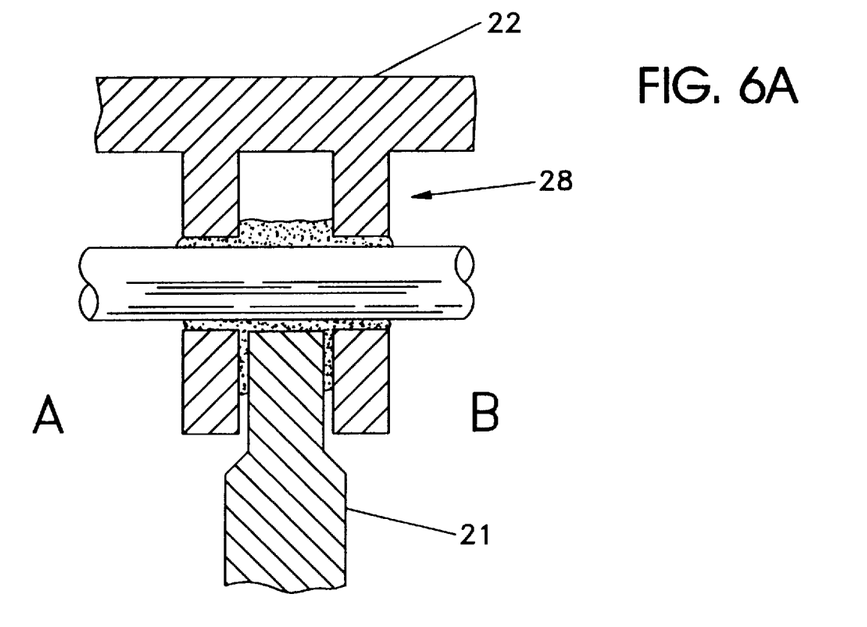
Figure 6B:
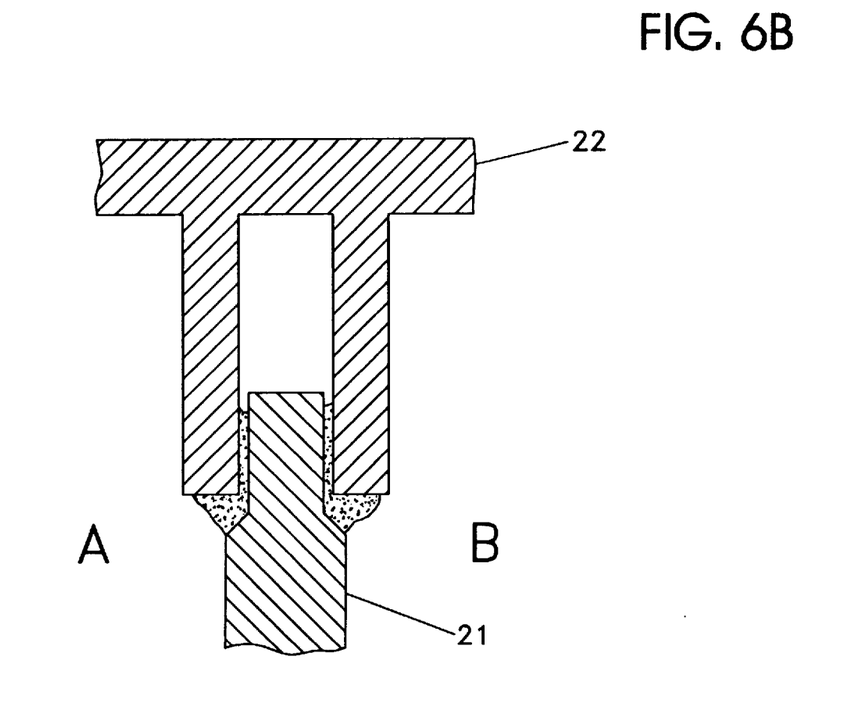

The print wiring board 50, on which the voltage comparator 32, the controller 33 and the amplifiers 31a . . . are mounted, is included in the electric circuit chamber A of the battery pack 20. The battery cell assemblies 30a . . . are retained in the battery chamber B, together with the flexible board 51 on which wiring, for connecting the electrodes of the battery cells, and the thermistor 36 are mounted. The leads 52a, 52b, . . . that extend from the flexible board 51 are inserted through the corresponding notches 27a, 27b, . . . of the partition wall 26 into the electric circuit chamber A. The edge of the partition wall 26 is covered with silicon rubber (see FIG. 6) and the atmospheres of the chambers A and B are completely separated.

The above described voltage comparator 32 and the controller 33 is provided with a drive voltage that is stabilized by regulators 41 and 42, which employ the output of the battery pack 20 as a power source. Thus, even when the battery pack 20 is not loaded into an electric/electronic apparatus, power is constantly supplied to the circuits 32 and 33, and a relatively high output terminal voltage (about 7.2 [V] or 10.8 [V]) of the battery cell is applied to the leads 52d and 52e. If, as in a conventional case, the electric circuit is mounted on the print wiring board 50 while the conductive portion of the electric circuit is exposed, that portion may be exposed to the gas that is generated by the vaporization of an electrolyte, or may be dampened by leaking electrolyte, and an ohmic short circuit may occur. In this embodiment, however, since the active portions, such as the leads 52d and 52e, to which a relatively high voltage is applied, are coated with silicon rubber, short circuits and the outbreak of fires can be appropriately prevented.

The present invention has been described in detail while referring to a specific embodiment. However, it should be obvious to one having ordinary skill in the art that various modifications or revisions of the embodiment are possible within the scope of the present invention. In the embodiment in this specification, notebook computers have been employed for explanation. The present invention can be employed for portable information processing apparatuses (e.g., word processors and other types of office devices) and other battery operated electric/electronic devices, such as portable telephones and portable video cameras. That is, although the present invention has been disclosed by using an example, it should not be limited to that example. To fully understand the scope of the present invention, reference should be made to the claims.

What is claimed is:

1. A battery pack, in which are integrally packaged one or more battery cells and an electric circuit for controlling charging and discharging of said battery cells, comprising:

a case for said battery cells that includes a partition for defining a battery chamber, for containing said battery cells, an electric circuitchamber for containing said electric circuit, said partition being formed of interleaved wall projections with sealant material arranged therebetween whereby said electric circuit is isolated from gasses in said battery cell chamber by said partition.

2. A battery pack, in which are integrally packaged one or more battery cells and an electric circuit for controlling charging and discharging of said battery cells, comprising:

a case for said battery cell that includes a partition formed of interleaved wall projections with sealant arranged therebetween for defining a battery chamber, for containing said battery cells, and an electric circuit chamber, for containing said electric circuit, wherein said electric circuit is isolated from the atmosphere in said battery cell chamber by said partition, and wherein at least one safety hole is formed in a battery cell side of the case in order to release an electrolyte that leaks from said battery cells.

3. A battery pack according to claim 1, wherein said battery cells have Positive terminals which are so arranged that they do not face toward said electric circuit.

4. A battery pack, according to claim 1, wherein said battery cells are so located that a sealing plate f or said battery cells is on the side that does not face toward said electric circuit.

5. A battery pack, according to claim 2, in which are integrally packaged one or more battery cells and an electric circuit for controlling charging and discharging of said battery cells, wherein said battery cells are so located that the safety hole for said battery cells is on the side that does not face toward said electric circuit.

6. A battery pack according to one of claim 1, wherein said case of said battery pack employs polycarbonate as a base and is toned with noninflammable dyes.

7. A battery pack according to claim 6, wherein said noninflammable dyes are titanium oxide.

8. A battery pack according to claim 1, wherein said one or more battery cells employ an inflammable organic solvent as an electrolyte.

9. A battery pack according to claim 5, wherein, when said safety hole is provided on both positive and negative electrodes of said battery cells, said battery cells are so located that the side of a lower strength of said battery cells is on the side that does not face toward said electric circuit.

* * * * *